United States Patent
Shih et al.

(10) Patent No.: US 11,358,177 B2
(45) Date of Patent: Jun. 14, 2022

(54) SYSTEM AND METHOD FOR DETECTING A COVER WITH AN ABNORMAL CONDITION

(71) Applicant: CVC Technologies, Inc., Taichung (TW)

(72) Inventors: Chi-Huan Shih, Taichung (TW); Chia Kai Chang, Taichung (TW); Chang Cheng Chen, Taichung (TW)

(73) Assignee: CVC TECHNOLOGIES, INC., Taichung (TW)

( * ) Notice: Subject to any disclaimer, the term of this patent is extended or adjusted under 35 U.S.C. 154(b) by 720 days.

(21) Appl. No.: 16/289,993

(22) Filed: Mar. 1, 2019

(65) Prior Publication Data
US 2020/0276618 A1     Sep. 3, 2020

(51) Int. Cl.
  *B07C 5/342*     (2006.01)
  *B07C 5/36*      (2006.01)
  *G01N 21/89*     (2006.01)

(52) U.S. Cl.
  CPC .......... *B07C 5/3422* (2013.01); *B07C 5/365* (2013.01); *G01N 21/8901* (2013.01); *G01N 21/8914* (2013.01)

(58) Field of Classification Search
  CPC .......... B07C 5/36; B07C 5/365; B07C 5/342; B07C 5/3422; G01N 21/8901; G01N 21/8914; G01N 21/8806; G01N 21/9009; G01N 21/909
  See application file for complete search history.

(56) References Cited

U.S. PATENT DOCUMENTS

| | | | | |
|---|---|---|---|---|
| 6,384,421 | B1* | 5/2002 | Gochar, Jr. | G01N 21/95 209/563 |
| 2009/0107896 | A1* | 4/2009 | Gochar, Jr. | B07C 5/365 209/577 |
| 2014/0360924 | A1* | 12/2014 | Smith | B07C 5/362 209/10 |
| 2017/0236270 | A1* | 8/2017 | Hanna | H04N 5/2256 348/92 |

FOREIGN PATENT DOCUMENTS

| CN | 201940378 U | 8/2011 |
|---|---|---|
| TW | M456861 U1 | 7/2013 |

* cited by examiner

*Primary Examiner* — Michael McCullough
*Assistant Examiner* — Kalyanavenkateshware Kumar
(74) *Attorney, Agent, or Firm* — Locke Lord LLP; Tim Tingkang Xia, Esq.

(57) ABSTRACT

This invention discloses a system and method for detecting a cover with an abnormal condition. The system includes a transport track for defining a sliding direction of at least one cover with a detection surface. The transport track has a detection area and a cover removal area, and includes a pair of bottom rails and a pair of side rails. The pair of bottom rails support the cover at an inclination angle so that the cover slides on the pair of bottom rails. The cover is located between the pair of side rails, and the sliding direction of the cover is defined by the pair of side rails. The detection area is used for detecting the detection surface of the cover, and the cover removal area has an outlet for removing a cover with an abnormal condition determined based on a detection result of the detection surface thereof.

26 Claims, 7 Drawing Sheets

SYSTEM AND METHOD FOR DETECTING A COVER WITH AN ABNORMAL CONDITION

BACKGROUND OF THE INVENTION

Field of the Invention

The present invention relates to a system and a method for detecting a cover with an abnormal condition, in particular to a system and a method for detecting and removing a cover with an abnormal condition before a locking cover process.

Description of the Prior Art

A conventional cover detecting apparatus is disclosed in Chinese Patent Publication No. CN201940378U published on Aug. 24, 2011. First a conveyor belt conveys a cover under test to a detection area in a horizontal way by using a driving force. Next, three cameras are arranged in a circular way to detect flaws and a reversing side of the cover, and finally an abnormal cover is conveyed to a cover removal area for removing the abnormal cover.

As well as a conventional cover detecting apparatus is disclosed in Taiwanese Patent Publication No. M456861 published on Jul. 11, 2013. First a cover under test makes its opening upward by an adjustment cylinder, and then a conveyor belt conveys the cover under test to an inversion rail in a horizontal way by using a driving force to invert the opening of the cover downward, and the cover is detected before and after the inversion rail, and finally an abnormal cover is removed at an end section of the conveyor belt.

The conveyor belts of the above two conventional cover detecting apparatuses all use driving force to convey the cover under test in a horizontal way that requires additional power and additional configuration of transmission mechanism, the plurality of covers cannot be arranged tightly to detect on the conveyor belt without effectively improving the detection capacity. Furthermore, the conveyor belt is non-transparent, so that the detection surface within the opening of the cover must be upward for detecting. The detection method of this manner is not suitable for the next locking cover process that the cover is locked on the opening of the bottle body. For this reason, the conventional cover detecting apparatus also requires an additional inversion rail for inverting the opening of the cover downward, which increases the cost of the additional apparatus.

Accordingly, the present invention provides a system and a method for detecting a cover with an abnormal condition that overcomes the above disadvantages.

SUMMARY OF THE INVENTION

The technical problem to be solved by the present invention is that the conveyor belt for conveying the cover under test in a horizontal manner requires additional power and the configuration of transmission mechanism without energy saving, in a loosely arranged way to make the cover under test without effectively improving the detection capacity, and the upward opening of the cover under test is not beneficial to the locking cover process. In view of this, a primary object of the present invention is to provide a system and a method for detecting a cover with an abnormal condition, using an inclination angle of a transport track, so that the cover slides on the transport track because of its own gravity for detection.

A secondary object of the present invention is to provide a system and a method for detecting a cover with an abnormal condition, which the cover is detected with the opening of the cover downward, and it is beneficial to match the following locking cover process of the packaging.

To achieve the above objects, the present invention provides a system for detecting a cover with an abnormal condition, comprising a transport track configured for defining a sliding direction of at least one cover with a detection surface, and the cover has a detection surface, wherein the transport track has a detection area and a cover removal area, and includes a pair of bottom rails and a pair of side rails, the pair of bottom rails support the cover at an inclination angle, so that the cover slides on the pair of bottom rails, the cover is located between the pair of side rails, and the sliding direction of the cover is defined by the pair of side rails, wherein the detection area is used for detecting the detecting surface of the cover, and the cover removal area has an outlet for removing a cover with an abnormal condition, which is determined based on a detection result of the detection surface thereof.

To achieve the above objects, the present invention provides a method for detecting a cover with an abnormal condition, which is used for removing a cover with an abnormal condition, comprising: using a pair of bottom rails to support the cover at an inclination angle, so that the cover slides on the pair of bottom rails; using a pair of bottom rails to define a sliding direction of the cover through the detection area and the cover removal area; in the detection area, a detection surface of the cover is detected; in the cover removal area, the cover with an abnormal condition is removed, which is determined based on a detection result of the detection surface thereof.

A system and a method for detecting a cover with an abnormal condition of the above, wherein a plurality of the covers are located between the pair of side rails and the covers slide in an adjacent arrangement way before entering the cover removal area, the spacing between the detection area and the cover removal area is an integer multiple of the width of the cover.

A system and a method for detecting a cover with an abnormal condition of the above, wherein the transport track further comprises a top rail which keeps the cover sliding between the pair of side rails.

A system and a method for detecting a cover with an abnormal condition of the above, wherein the detection surface of the cover is formed of a circle area, and the cover has a lateral wall around the detection surface, and the pair of bottom rails support the lateral wall of the cover, and the spacing of the pair of bottom rails is at least larger than the diameter of the detection surface and less than the width of the cover.

A system and a method for detecting a cover with an abnormal condition of the above, further comprising a camera and a light source device, the camera is located below the pair of bottom rails of the detection area, and the light source device is located between the camera and the pair of bottom rails, so that the detection surface of the cover is downward to slide on the pair of bottom rails, and then the camera captures an image of the detection surface between the pair of bottom rails.

A system and a method for detecting a cover with an abnormal condition of the above, further comprising a cover removal rail, an air blower, and a baffle, the cover removal rail is coupled to the outlet of the cover removal area for collecting the cover with an abnormal condition, the air blower controllably provides an air blowing direction and configured at the side of the other side rail of the cover removal area, so that the blowing direction is aligned to the outlet of the cover removal area, the baffle is configured at the outlet of the cover removal area, which controllably opens the outlet, so that the cover with an abnormal condition can pass through the outlet According to embodiments of the present invention, which can transport the covers under test sliding without driving power by their own gravity, while the covers under test can be detected in a tightly arrangement way with the opening downward, and in general, the system and the method of the present invention can effectively improve the detection capacity and save power, it also no longer need to an action for inverting the cover by using an inversion rail, thus reducing the assembly time and production cost.

DETAILED DESCRIPTION OF THE PREFERRED EMBODIMENTS

Figure 1:
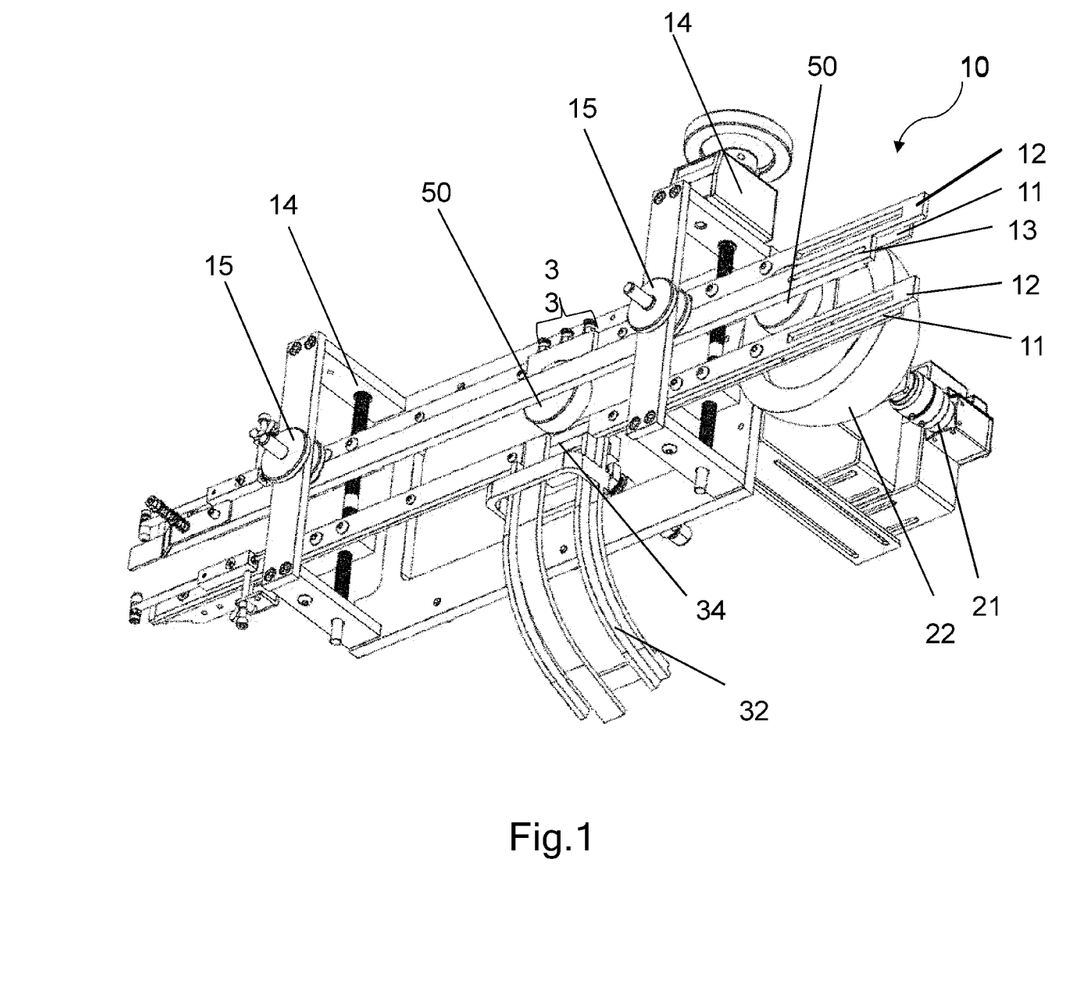
FIG. 1 shows a perspective view of a system for detecting a cover with an abnormal condition according to the present invention.
Figure 2:
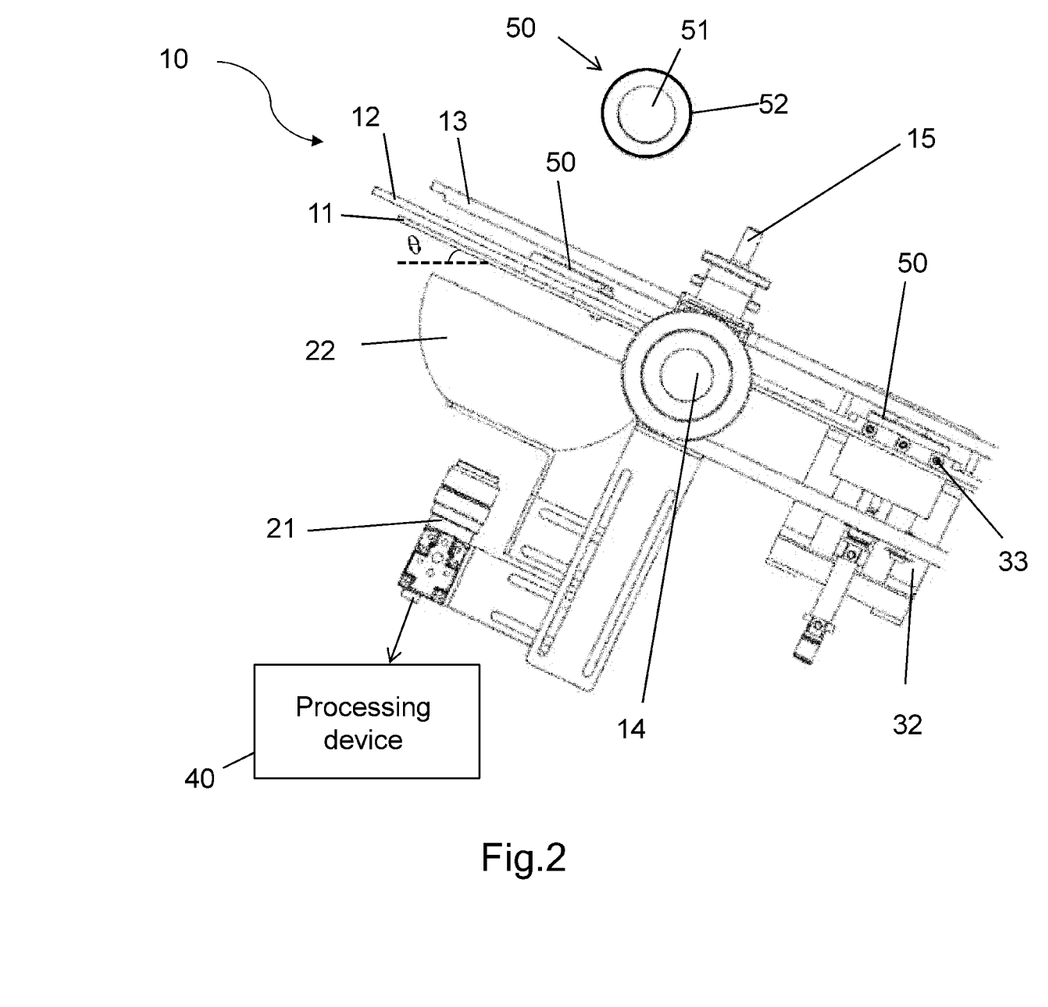
FIG. 2 shows a side view of the system for detecting a cover with an abnormal condition of FIG. 1.
Figure 3:
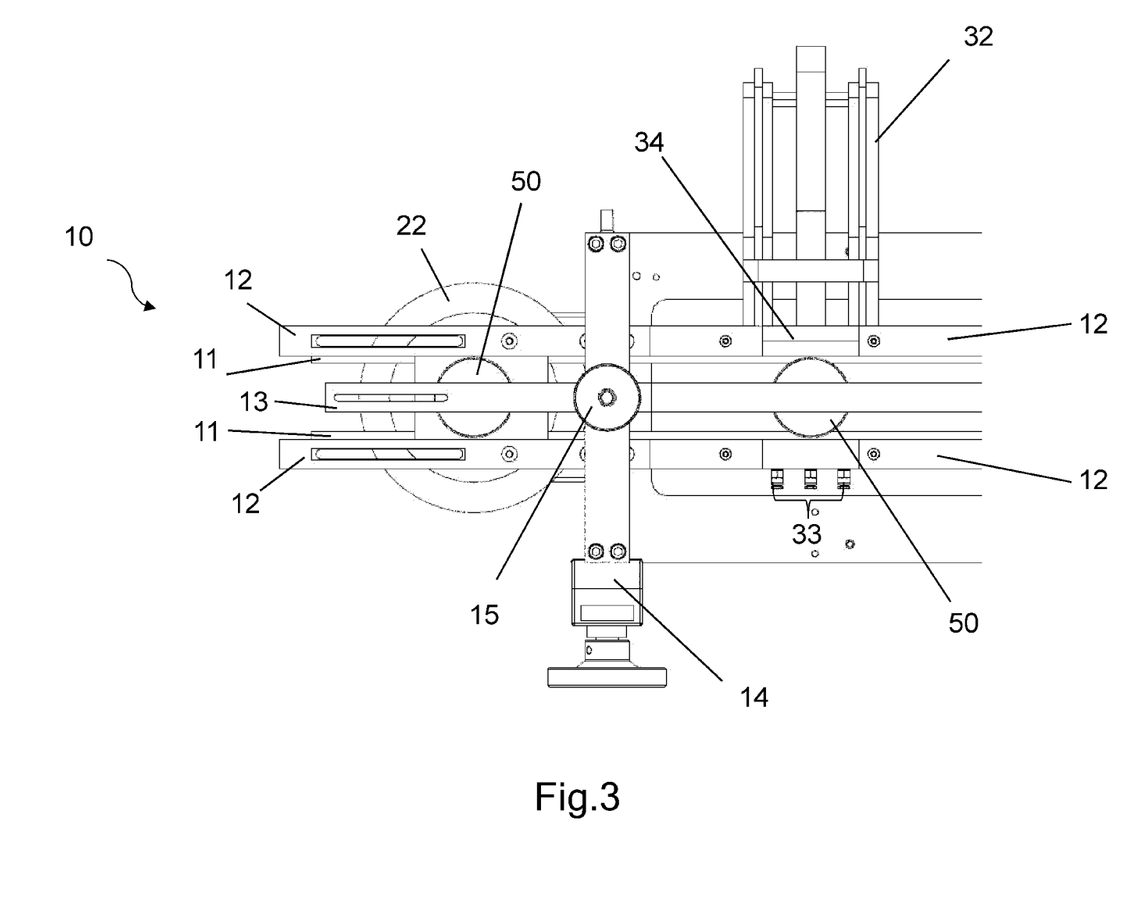
FIG. 3 shows a top view of the system for detecting a cover with an abnormal condition of FIG. 1.
Figure 6:
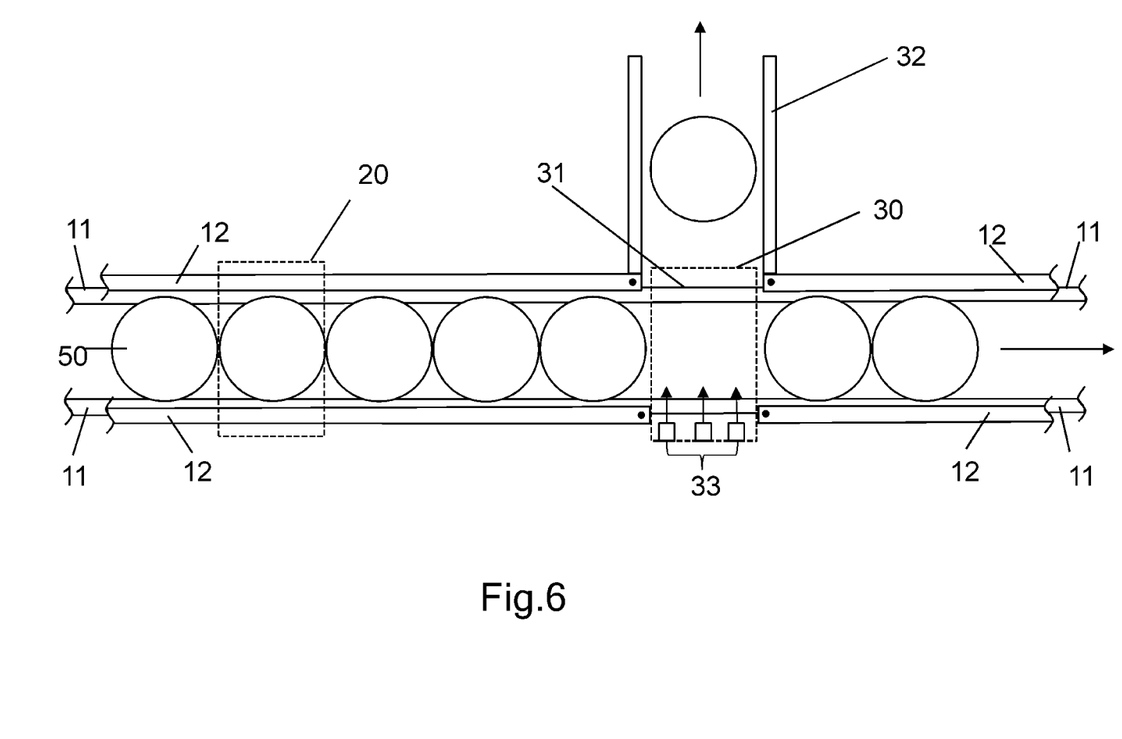
FIG. 6 shows the process of removing a cover of the system for detecting a cover with an abnormal condition of FIG. 1.

The system for detecting a cover with an abnormal condition of the present invention has the perspective view, the side view and the top view as shown in FIG. 1 to FIG. 3, wherein two covers 50 are respectively located in a detection area 20 and a cover removal area 30 of a transport track 10. The system of the present invention is used for detecting the cover 50 with an abnormal condition, the abnormal condition comprises: the detection surface of the cover 50 has a defect or the opening of the cover 50 is upward for detecting. The system for detecting a cover with an abnormal condition of the present invention comprises: the transport track 10, which is used for transporting a plurality of the cover 50, and the opening of the cover 50 is downward for detecting, the transport track 10 configures the detection area 20 and the cover removal area 30. As shown in FIG. 6, the transport track 10 comprises a pair of bottom rails 11, a pair of side rails 12 and a top rail 13, wherein the pair of bottom rails 11 support the cover 50 at an inclination angle θ, so that the cover 50 slides on the pair of bottom rails 11 by its own gravity as shown in FIG. 2, and the inclination angle θ decides a sliding speed of the cover 50 sliding on the pair of bottom rails 11. The cover 50 is located between the pair of side rails 12, and the sliding direction of the cover 50 is defined by the pair of side rails 12. The top rail 13 is located between the pair of side rails 12 to keep the cover 50 sliding smoothly between the pair of side rails 12.

In addition, the system for detecting a cover with an abnormal condition of the present invention comprises: an adjustment device 14, which rotates a rotating screw to adjust the spacing of the pair of bottom rails 11 and/or the pair of side rails 12, wherein the pair of side rails 12 is coupled to the rotating screw of the adjustment device 14. The adjustment device 14 adjusts the spacing of the pair of side rails 12 slightly larger than the width of the cover 50 to keep that the cover 50 is supported by the pair of bottom rails 11 and slides smoothly between the pair of side rails 12 through the detection area 20 and the cover removal area 30. The adjustment device 14 further comprises a knob 15, which is configured above the transport track 10 and coupled to the top rail 13, and the knob 15 is used for adjusting the height of the top rail 13 to conform to the height of the cover 50, while keeping the cover 50 sliding smoothly between the pair of side rails 12.

With reference to FIG. 1 and FIG. 2, the cover 50 is detected in the detection area 20. The side below the cover 50 in the detection area 20 configures a camera 21 and a light source device 22, wherein the camera 21 is below the pair of the bottom rails 11, and the light source device 22 is located between the camera 21 and the pair of the bottom rails 11, the light source device 22 provides an annular illumination to the cover 50 which located in the detection area 20, so that the camera 21 captures the detection image of the detection surface of the cover 50 between the pair of bottom rails 11 by using the annular illumination, and provides the detection image to a processing device 40 to detect whether the cover 50 in the detection area 20 is abnormal or not. In an embodiment of the present invention, the detection surface of the cover 50 is a surface of circular lining, which can be made of aluminum foil material, and the spacing between the pair of bottom rails 11 is at least larger than the diameter of the detection surface and slightly less than the width of the cover 50.

With reference to FIG. 1 and FIG. 3, the cover 50 with an abnormal condition is removed in the cover removal area 30. The system for detecting a cover with an abnormal condition of the present invention further comprises: a cover removal rail 32, an air blower 33 and a baffle 34. The cover removal rail 32 is configured at the one side of the transport track 10 in the cover removal area 30. One of the side rails 12 in the cover removal area 30 forms an outlet 31, as shown in FIG. 6. The cover removal rail 32 is coupled to the outlet 31 of the pair of side rails 12 for collecting the cover 50 with an abnormal condition which is removed through the outlet 31. The baffle 34 is configured at the outlet 31 for blocking the non-abnormal cover through the outlet 31 into the cover removal rail 32. In addition, the air blower 33 is configured on the other side of the cover removal area 30 relative to the outlet 31, the air blower 33 controllably provides an air blowing direction, so that the air blowing direction is aligned to the outlet 31 of the cover removal area 30.

The camera 21 of the detection area 20 and the air blower 33 of the cover removal area 30 and the baffle 34 are further electrically connected to the processing device 40 as shown in FIG. 2, the processing device 40 is used for outputting signals and processing information, such as Programmable Logic Controller (PLC), Central Processing Unit (CPU), etc.

Figure 4:
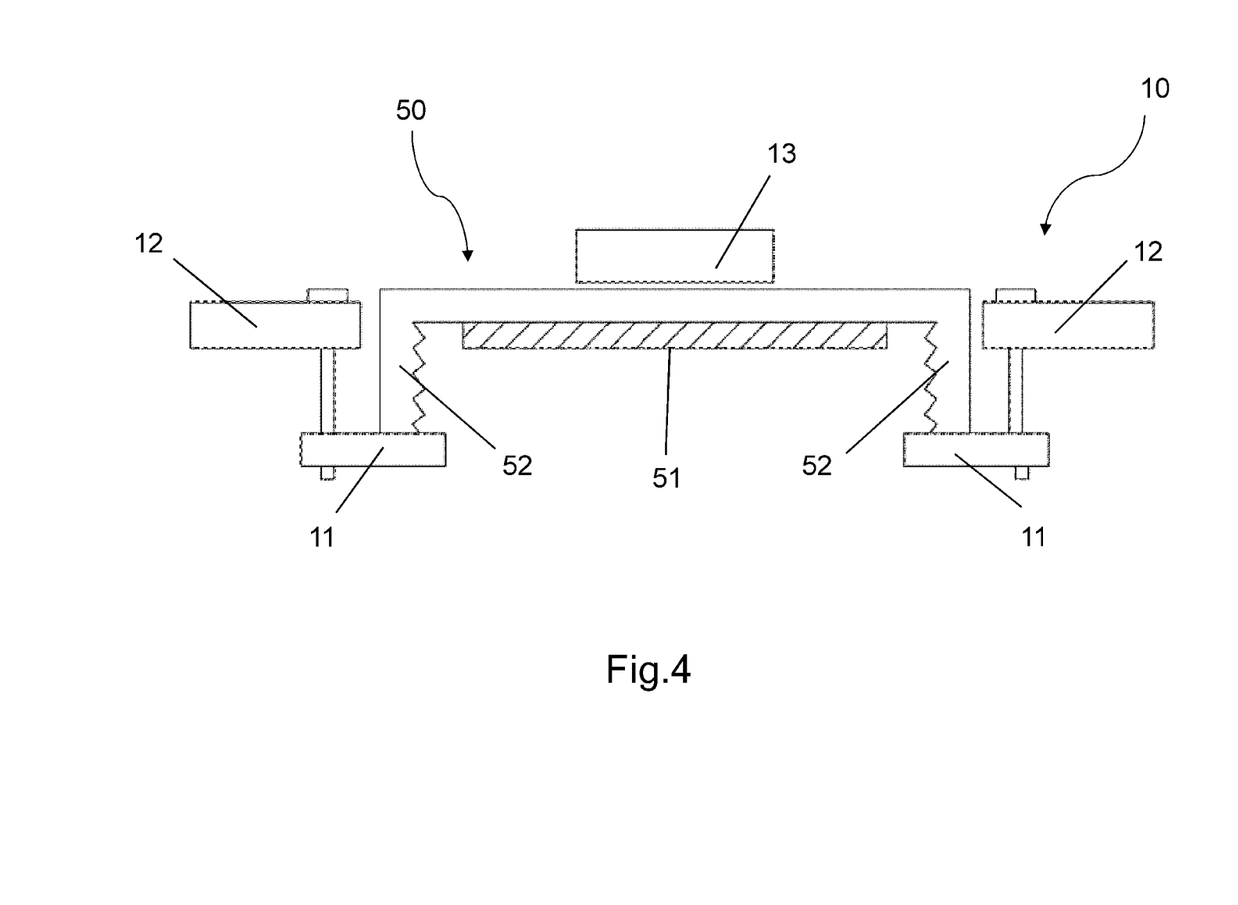
FIG. 4 shows a cross-sectional view of the cover and the transport track according to one embodiment of the present invention.

With reference to FIG. 4, showing a cross-sectional view of the cover 50 and the transport track 10 according to one embodiment of the present invention. In this embodiment of the present invention, the transport track 10 is used for the system for detecting a cover with an abnormal condition as shown in FIG. 1 to FIG. 3. The transport track 10 comprises a pair of the bottom rails 11, a pair of side rails 12 and a top rail 13, wherein the pair of side rails 12 is fixed on the pair of bottom rails 11 to keep the spacing between the pair of bottom rails 11 slightly less than the spacing of the pair of side rails, the spacing of the pair of side rails 12 conforms to the width of the cover 50, which is determined based on the adjustment device 14, so that the pair of bottom rails exactly support the lateral wall 52 of the cover 50. FIG. 1 shows that the adjustment device 14 is coupled to the bottom of the pair of bottom rails 11 by using a rotating screw to adjust the spacing of the pair of bottom rails 11 at least larger than the diameter of the detection surface 51. The inner surface of the cover 50 has a circular lining, such as an aluminum foil lining, the surface of the circular lining is the detection surface 51 of the cover 50, the cover 50 has a lateral wall 52 around the detection surface 51, and the pair of bottom rails 11 support the lateral wall 52 of the cover 50 with the opening downward, so that the camera 21 located below the pair of bottom rails 11 can capture the detection image between the pair of bottom rails 11 while the cover 50 passes through the detection area 20. When the cover 50 slides between the pair of side rails, there is a spacing between the pair of side rails 12 and the lateral wall 52, so that the cover 50 can smoothly slide on the pair of side rails 12. In addition, the top rail 13 is located above the cover 50, and adjusts the height of the top rail 13 by the knob 15 to ensure that the cover 50 can smoothly slide on the pair of side rails 12.

Figure 5:
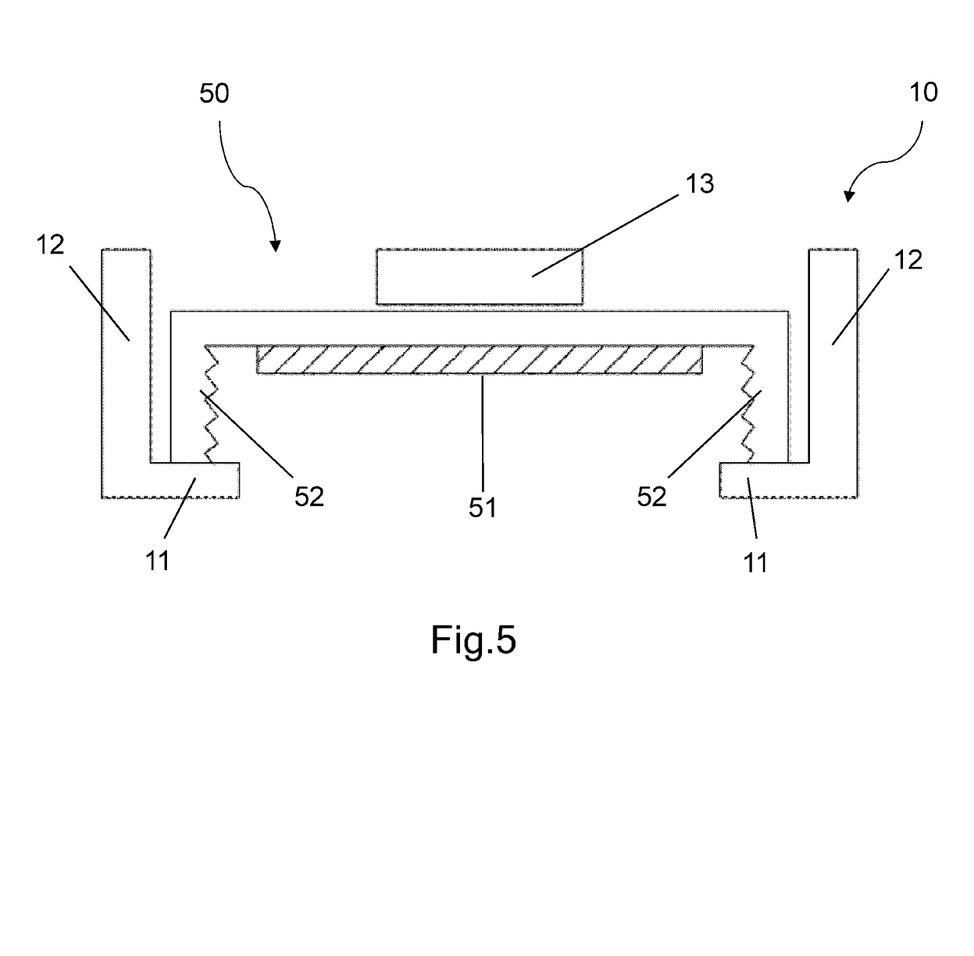
FIG. 5 shows a cross-sectional view of the cover and the transport track according to another embodiment of the present invention.

With reference to FIG. 5, showing a cross-sectional view of the cover 50 and the transport track 10 according to another embodiment of the present invention. In this embodiment of the present invention, the transport track 10 as shown in FIG. 5 can replace the transport track 10 of the system for detecting a cover with an abnormal condition of the present invention as shown in FIG. 1 to FIG. 3. The transport track 10 shown in FIG. 5 comprises a pair of bottom rails 11, a pair of side rails 12 and a top rail 13, wherein the pair of bottom rails 11 extends inward from the bottom of the pair of side rails 12, so that the pair of bottom rails 11 is perpendicular to the pair of side rails 12 respectively. The spacing between the pair of side rails 12 is determined to conform to the width of the cover 50 by the adjustment device 14, so that the pair of bottom rails 11 just right support the lateral wall 52 of the cover 50. FIG. 1 shows that the adjustment device 14 is coupled to the bottom of the pair of bottom rails 11 by using a rotating screw to adjust the spacing of the pair of bottom rails 11 at least larger than the diameter of the detection surface 51. The pair of bottom rails 11 support the lateral wall 52 of the cover 50 with the opening downward, so that the camera 21 located below the pair of bottom rails 11 can capture the detection image between the pair of bottom rails 11 while the cover 50 passes through the detection area 20. When the cover 50 slides between the pair of side rails. There is a spacing between the pair of side rails 12 and the lateral wall 52 when the cover 50 slides between the pair of side rails 12, so that the cover 50 can smoothly slide on the pair of side rails 12. In addition, the top rail 13 is located above the cover 50 and adjusts the height of the top rail 13 by the knob 15 to ensure that the cover 50 can smoothly slide on the pair of side rails.

In general, the embodiments as shown in FIG. 4 and FIG. 5, by defining an inclination angle θ of the transport track 10 as shown in FIG. 2, a plurality of the cover 50 can be kept smoothly sliding on the transport track 10 without derailment to achieve the cover 50 transported through the detection area 20 and the cover removal area 30. It is also possible for skilled people in the art to refer to these two embodiments to achieve the combination of same efficiency of the transport track.

With reference to FIG. 6, showing the process of removing a cover of the system for detecting a cover with an abnormal condition according to the present invention. The operator properly determines an inclination angle θ of the transport track 10 and the adjustment device 14 to adjust the spacing between the bottom rails, a plurality of the covers under test 50 slide in tightly arrangement way through the detection area 20 and the cover removal area 30 by its own gravity. Preferably, the inclination angle θ of the transport track 10 is between 25 degrees and 30 degrees. The distance between the detection area 20 and the cover removal area 30 is an integral multiple of the width of the cover. For the embodiment as shown in FIG. 6, the distance between the detection area 20 and the cover removal area 30 is three times of the width of the cover. Therefore, when a cover 50 is in the detection area 20 and then sliding through the width of three covers, the cover 50 will be in the cover removal area 30.

Continue with reference to FIG. 6, when the first cover 50 is detected in the detection area 20, next the processing device 40 counts the fifth cover 50 which slides into the detection area 20, the first cover 50 is just right located on the cover removal area 30, the processing device 40 determines whether a cover removal action is performed in the cover removal area 30, the cover removal action includes: the baffle 34 opens the outlet 31, the first cover 50 is blown into the cover removal rail 32 by the air blower 33, and the baffle 34 closes the outlet 31. If the processing device 40 detects a cover with an abnormal condition according to the detection image of the first cover 50 in the detection area 20, then the processing device 40 counts the fifth cover 50 which reaches to the detection area 20, the processing device 40 determines to perform a cover removal action in the cover removal area 30, Conversely, the processing device 40 determines not to perform a cover removal action in the cover removal area 30. When the second cover 50 is detected in the detection area 20, next the processing device 40 counts the sixth cover 50 which slides into the detection area 20, the second cover 50 is just right located on the cover removal area 30, the processing device 40 determines whether a cover removal action is performed in the cover removal area 30, and so on.

Figure 7:
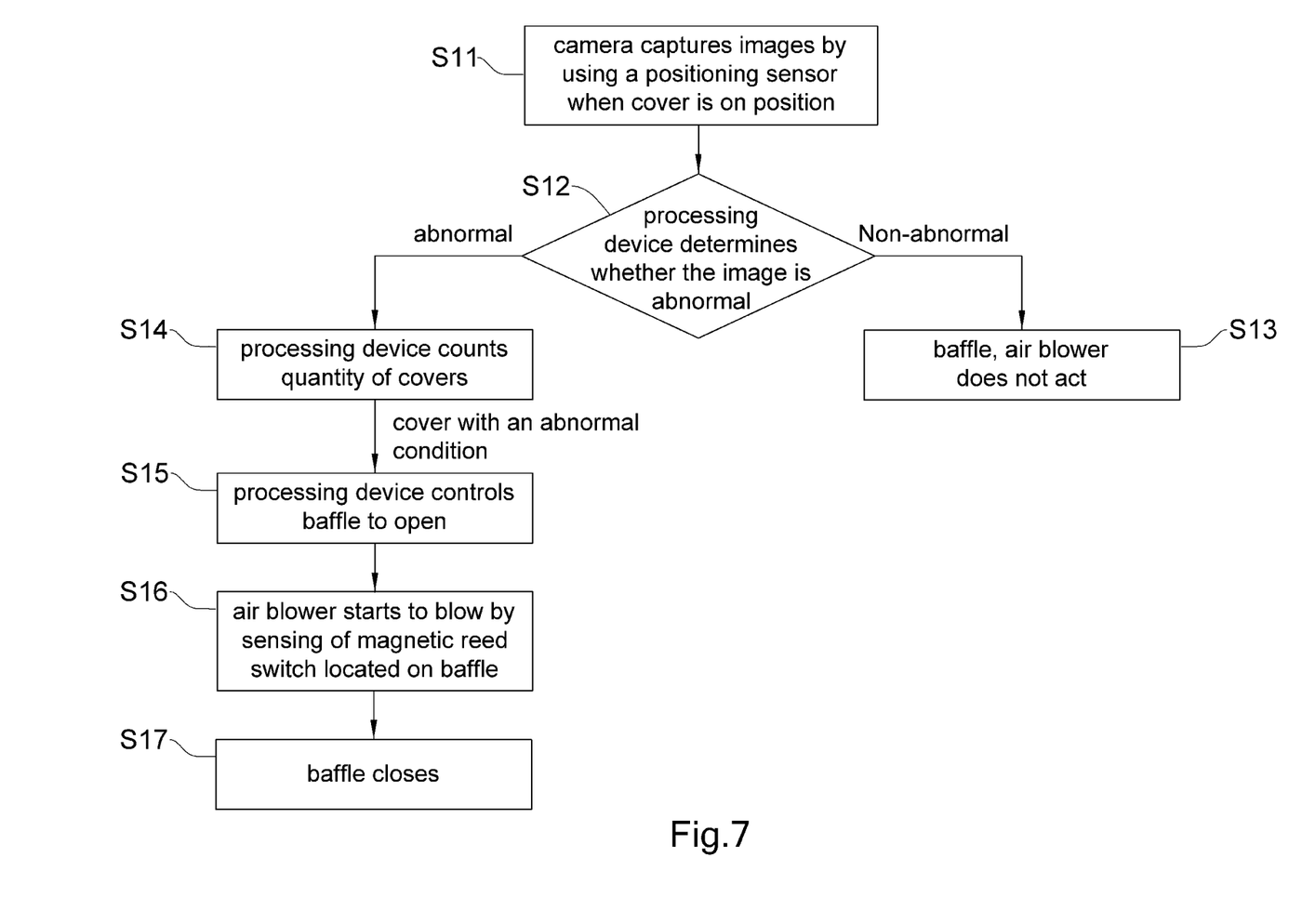
FIG. 7 shows a flow diagram of a method for detecting a cover with an abnormal condition according to the present invention.

With reference to FIG. 7 and FIG. 6, showing a flow diagram of a method for detecting a cover with an abnormal condition according to the present invention. The present invention provides a method for detecting a cover with an abnormal condition, which is used for a system for detecting a cover with an abnormal condition, for example as the system shown in FIG. 1 to FIG. 3. The method for detecting a cover with an abnormal condition of the present invention comprises the following steps.

In step S11, the cover under test 50 will be detected in the detection area 20. When the cover under test 50 slides along the transport track 10 into the detection area 20 that the cover under test 50 can be detected by a positioning sensor and notified to the processing device 40, so that the camera 21 captures a detection image. It is further explained that the cover under test 50 slides into the detection area 20, the positioning sensor of the detection area 20 (not shown in Figures) detects the positioning and notifies to the processing device 40, so that the camera 21 can capture the detection image of the cover under test 50 by using the illumination of the light source device 22 below the cover 50, which illuminates on the detection surface 51 of the cover under test 50 from each angle, reflects from the detection surface 51 and focus on the camera 21 to clearly capture the image of the detection surface 51, and then transmits the captured image to the processing device 40 to determine whether the cover under test 50 is abnormal.

In step S12, the processing device 40 determines the detection images captured from step S11, and detects whether the cover under test 50 is abnormal. Since the cover under test 50 may slide on the bottom rails with the opening upward or downward, so the detection image may show the top surface of the cover under test 50 or the inner detection surface 51 of the cover under test 50. In an embodiment, the determining method of the processing device 40 is used by comparing the current detection image of the lining with the default image and according to a threshold to determine whether a difference between two images exceeds the threshold. If the difference between the two images exceeds the threshold, the processing device 40 determines that the cover under test 50 is abnormal, then perform step S14. If the difference between the two images does not exceed the threshold, the processing device 40 determines that the cover under test 50 is non-abnormal, then perform step S13. In step S13, when the cover under test 50 determined in step S13 is into the cover removal area 30, the processing device 40 determines not to perform a cover removal action, and the baffle 34, air blower 33 does not act.

In step S14, as shown in FIG. 6, the distance from the detection area 20 to the cover removal area 30 is fixed, therefore, the distance can only contain a fixed number of covers, so the processing device 40 only needs to calculate the quantity of the covers 50 through the detection area 20 by a positioning sensor, it can be immediately known that the cover under test 50 has slide into the cover removal area 30 according to the determination of step S11, for example, if the cover under test 50 is $n^{th}$ cover through the detection area 20, then the processing device 40 counts the $n+4^{th}$ cover through the detection area 20, and the cover under test 50 will be located in the cover removal area.

In step S15, when the cover under test 50 determined from step S11 is in the cover removal area 30 and the processing device 40 determines that the cover 50 is abnormal, the processing device 40 determines to perform a cover removal action from step S15 to step S17. The processing device 40 outputs a signal to control the baffle 34 to open the outlet 31 (does not output a signal without an abnormal cover), continuing step S16, when the baffle 34 completely opens the outlet 31, the magnetic reed switch on the baffle 34 (not shown in Figures) will sense and output a signal back to the processing device 40, the processing device 40 will set a blowing time to control the air blower 33 blowing the cover under test 50 into the cover removal rail 32. Wherein the blowing time is set by this embodiment is about 1 second. In different embodiments, the tightly arrangement of multiple of the cover under test 50 sliding on the transport track 10 can be allowed for increasing the spacing between each other, sliding through the detection area 20 and the cover removal area 30 in sequence and increasing the blowing time to ensure the accuracy of the cover removal action. At final step S17, when the blowing time is over, the baffle 34 closes the outlet 31, so that the cover 50 with an abnormal condition does not slide into the cover removal area 32, until there is the next cover 50 with an abnormal condition in the cover removal area 30, and then proceed with the cover removal operation.

After the covers are detected by the method for detecting a cover with an abnormal condition of the present invention, the covers 50 through the cover removal area 30 are all non-abnormal, will continue to slide along the transport track 10 to the packaging area with their openings downward that are easy to lock on bottle body, and complete the operation of the packaging.

What is claimed is:

1. A system for detecting a cover with an abnormal condition, comprising:
   a transport track, which is configured for defining a sliding direction of at least one cover with a detection surface;
   wherein, the transport track has a detection area and a cover removal area, and includes a pair of bottom rails and a pair of side rails, the pair of bottom rails support the cover at an inclination angle, so that a plurality of the covers slide on the pair of bottom rails in an adjacent arrangement way through the detection area and the cover removal area by their own gravity, the cover is located between the pair of side rails, and the sliding direction of the cover is defined by the pair of side rails; and
   wherein, the detection area is used for detecting the detecting surface of the cover, and the cover removal area has an outlet for removing a cover with an abnormal condition, which is determined based on a detection result of the detection surface thereof;
   wherein the spacing between the detection area and the cover removal area is an integer multiple of the width of the cover, whereby the system simultaneously performs an action of the detection area for detecting the detecting surface of one of the covers and an action of the cover removal area for removing another one of the covers with an abnormal condition.

2. The system for detecting a cover with an abnormal condition of claim 1, wherein the transport track further comprises a top rail which keeps the cover sliding between the pair of side rails.

3. The system for detecting a cover with an abnormal condition of claim 1, wherein the detection surface of the cover is a surface of inner lining.

4. The system for detecting a cover with an abnormal condition of claim 1, wherein the cover has a lateral wall around the detection surface, and the pair of bottom rails support the lateral wall of the cover.

5. The system for detecting a cover with an abnormal condition of claim 1, further comprising a camera which is located below the pair of bottom rails of the detection area.

6. The system for detecting a cover with an abnormal condition of claim 5, wherein the detection surface of the cover is downward, so that the camera captures an image of the detection surface between the pair of bottom rails.

7. The system for detecting a cover with an abnormal condition of claim 5, further comprising a light source device which is located between the camera and the pair of bottom rails.

8. The system for detecting a cover with an abnormal condition of claim 1, wherein the detection surface of the cover is formed of a circle area, and the spacing of the pair of bottom rails is at least larger than the diameter of the detection surface and less than the width of the cover.

9. The system for detecting a cover with an abnormal condition of claim 1, further comprising an adjustment device configured at one side of the transport track for adjusting the spacing between the pair of bottom rails.

10. The system for detecting a cover with an abnormal condition of claim 1, wherein the pair of side rails define the cover sliding into the detection area and the cover removal area.

11. The system for detecting a cover with an abnormal condition of claim 1, further comprising a cover removal rail which is coupled to the outlet of the cover removal area for collecting the cover with an abnormal condition.

12. The system for detecting a cover with an abnormal condition of claim 1, wherein the outlet is configured on one of the side rails of the cover removal area.

13. The system for detecting a cover with an abnormal condition of claim 12, further comprising an air blower which controllably provides an air blowing direction, the air blower is configured at the side of the other side rail of the cover removal area, so that the air blowing direction is aligned to the outlet of the cover removal area.

14. The system for detecting a cover with an abnormal condition of claim 1, further comprising a baffle configured at the outlet of the cover removal area, wherein the baffle controllably opens the outlet, so that the cover with an abnormal condition passes through the outlet.

15. The system for detecting a cover with an abnormal condition of claim 1, wherein the cover with an abnormal condition is that the detection surface has a defect or the image of the detection surface cannot be captured.

16. The system for detecting a cover with an abnormal condition of claim 1, wherein a plurality of the covers are located between the pair of side rails and the covers keep sliding in an adjacent arrangement way before entering the cover removal area.

17. A method for detecting a cover with an abnormal condition, which is used for removing a cover with an abnormal condition, comprising:
   using a pair of bottom rails to support the cover at an inclination angle, so that the cover slides on the pair of bottom rails by its own gravity;
   using the pair of bottom rails to define a sliding direction of the cover through a detection area and a cover removal area, so that a plurality of the covers slides on the pair of bottom rails in an adjacent arrangement way through the detection area and the cover removal area;
   in the detection area, a detection surface of the cover is detected; and
   in the cover removal area, the cover with an abnormal condition is removed, which is determined based on a detection result of the detection surface thereof;
   wherein the spacing between the detection area and the cover removal area is kept an integer multiple of the width of the cover so that the system simultaneously performs an action of the detection area for detecting the detecting surface of one of the covers and an action of the cover removal area for removing another one of the covers which shows an abnormal condition.

18. The method for detecting a cover with an abnormal condition of claim 17, further comprising:
   using a top rail configured between the pair of side rails, so that the top rail keeps the cover sliding between the pair of the bottom rails.

19. The method for detecting a cover with an abnormal condition of claim 17, further comprising:
   configuring a camera located below the pair of bottom rails in the detection area.

20. The method for detecting a cover with an abnormal condition of claim 19, further comprising:
   making the detection surface of the cover downward to slide on the pair of bottom rails, so that the camera captures an image of the detection surface between the pair of bottom rails.

21. The method for detecting a cover with an abnormal condition of claim 19, further comprising:
   configuring a light source device located between the camera and the pair of bottom rails.

22. The method for detecting a cover with an abnormal condition of claim 17, further comprising:
   configuring a cover removal rail coupled to an outlet of the cover removal area for collecting the cover with an abnormal condition.

23. The method for detecting a cover with an abnormal condition of claim 17, further comprising:
   configuring an outlet located on one of the side rails of the cover removal area for a cover with an abnormal condition passing through.

24. The method for detecting a cover with an abnormal condition of claim 23, further comprising:
   providing a controllably air blowing direction from one side of the other side rail in the cover removal area, so that the air blowing direction is aligned to the outlet.

25. The method for detecting a cover with an abnormal condition of claim 17, further comprising:
   configuring a baffle located at an outlet of the cover removal area, wherein the baffle controllably opens the outlet, so that the cover with an abnormal condition pass through the outlet.

26. The method for detecting a cover with an abnormal condition of claim 17, further comprising:
   using the pair of the bottom rails to keep a plurality of the covers sliding in an adjacent arrangement way before entering the cover removal area.

* * * * *